United States Patent
Cai et al.

(10) Patent No.: US 11,138,758 B2
(45) Date of Patent: Oct. 5, 2021

(54) IMAGE PROCESSING METHOD AND APPARATUS, AND STORAGE MEDIUM

(71) Applicant: SenseTime International PTE. LTD., Singapore (SG)

(72) Inventors: Zhongang Cai, Singapore (SG); Cunjun Yu, Singapore (SG); Haiyu Zhao, Singapore (SG); Shuai Yi, Singapore (SG)

(73) Assignee: SenseTime International PTE. LTD., Singapore (SG)

( * ) Notice: Subject to any disclaimer, the term of this patent is extended or adjusted under 35 U.S.C. 154(b) by 0 days.

(21) Appl. No.: 16/922,051

(22) Filed: Jul. 7, 2020

(65) Prior Publication Data

US 2021/0201532 A1 Jul. 1, 2021

Related U.S. Application Data

(63) Continuation of application No. PCT/IB2020/052537, filed on Mar. 19, 2020.

(30) Foreign Application Priority Data

Dec. 30, 2019 (SG) .............................. 10201913744S

(51) Int. Cl.
*G06T 7/73* (2017.01)

(52) U.S. Cl.
CPC ...................................... *G06T 7/74* (2017.01)

(58) Field of Classification Search
CPC ....................................................... G06T 7/74

USPC ......................................................... 382/103
See application file for complete search history.

(56) References Cited

FOREIGN PATENT DOCUMENTS

| CN | 108229493 A | * | 6/2018 |
| CN | 108229493 A | | 6/2018 |
| CN | 109359559 A | * | 2/2019 |
| CN | 109359559 A | | 2/2019 |
| CN | 109635721 A | * | 4/2019 |
| CN | 109635721 A | | 4/2019 |
| CN | 110443143 A | | 11/2019 |
| CN | 110443143 B | * | 12/2020 |

* cited by examiner

*Primary Examiner* — Wednel Cadeau
(74) *Attorney, Agent, or Firm* — BakerHostetler

(57) ABSTRACT

The present disclosure relates to an image processing method and apparatus, an electronic device, and a storage medium. The method includes: acquiring a first image and a first attention map of a first target object in the first image, where the first attention map indicates the position of the first target object in the first image; acquiring a second image and a second mask image of the second image, where pixel values of pixels in the second mask image are equal; and obtaining, according to first input information and second input information, a first prediction result that indicates the position of the first target object in the second image, where the first input information is determined according to the first image and the first attention map, and the second input information is determined according to the second image and the second mask image.

19 Claims, 3 Drawing Sheets

IMAGE PROCESSING METHOD AND APPARATUS, AND STORAGE MEDIUM

This present application is a bypass continuation of and claims priority under 35 U.S.C. § 111(a) to PCT Application. No. PCT/IB2020/052537, filed on Mar. 19, 2020, which claims priority to Singapore Provisional Patent Application No. 10201913744S filed on Dec. 30, 2019, and entitled "IMAGE PROCESSING METHOD AND APPARATUS, ELECTRONIC DEVICE, AND STORAGE MEDIUM". The entireties of these applications are incorporated herein by reference.

TECHNICAL FIELD

The present disclosure relates to the field of computer vision technologies, and in particular, to an image processing method and apparatus, an electronic device, and a storage medium.

BACKGROUND

Computer vision is a technology that uses computer and related equipment to simulate biological vision. It can process a captured image or video to obtain three-dimensional information of a corresponding scene. In an application of computer vision, the captured image or video can be used for target detection to locate the position of a target object in the image.

SUMMARY

The present disclosure provides technical solutions for image processing.

According to one aspect of the present disclosure, provided is an image processing method, including:

acquiring a first image and a first attention map of a first target object in the first image, where the first attention map indicates the position of the first target object in the first image;

acquiring a second image and a second mask image of the second image, where pixel values of pixels in the second mask image are equal; and obtaining, according to first input information and second input information, a first prediction result that indicates the position of the first target object in the second image, where the first input information is determined according to the first image and the first attention map, and the second input information is determined according to the second image and the second mask image.

In one possible implementation, the method further includes:

acquiring a second attention map of the second image according to a detection result for a second target object in the second image, where the second attention map indicates the position of the second target object in the second image;

after obtaining the first prediction result, the method further includes:

obtaining, according to third input information and fourth input information, a first score of association that represents the degree of association between the first target object and the second target object, where the third input information is determined according to the second image and the second attention map, and the fourth input information is determined according to the second image and the first prediction result; and determining a result of association between the first target object and the second target object according to the first score of association.

In one possible implementation, the method further includes:

obtaining, according to the first input information and the third input information, a second score of association that represents the degree of association between the first target object and the second target object; and the determining a result of association between the first target object and the second target object according to the first score of association includes:

determining a result of association between the first target object and the second target object according to the first score of association and the second score of association.

In one possible implementation, the method further includes:

acquiring a second prediction result that indicates the position of the second target object in the first image;

obtaining, according to fifth input information and the first input information, a third score of association that represents the degree of association between the first target object and the second target object, where the fifth input information is determined according to the first image and the second prediction result; and the determining a result of association between the first target object and the second target object according to the first score of association includes:

determining the result of association between the first target object and the second target object according to the first score of association and the third score of association.

In one possible implementation, the determining the result of association between the first target object and the second target object according to the first score of association and the third score of association includes:

determining a final score of association between the first target object and the second target object according to the first score of association and the third score of association; and in a case that the final score of association is greater than a score threshold, determining that the result of association indicates the first target object being potentially associated with the second target object.

In one possible implementation, the method further includes:

in a case that the final score of association is less than or equal to the score threshold, determining that the result of association indicates the first target object being not associated with the second target object.

In one possible implementation, the determining the result of association between the first target object and the second target object according to the first score of association and the third score of association includes:

determining the final score of association between the first target object in the first image and the second target object according to the first score of association and the third score of association; and matching, according to a final score of association between each first target object in the first image and each second target object in the second image, the each first target object with the each second target object to obtain a result of association between the each first target object and the each second target object.

In one possible implementation, the matching, according to a final score of association between each first target object in the first image and each second target object in the second image, the each first target object with the each second target object to obtain a result of association between the each first target object and the each second target object includes:

determining a sum of scores of association between the each first target object and the each second target object according to the final score of association between the each first target object in the first image and the each second target object in the second image; and in a case that the sum of scores of association is the maximum and greater than a predetermined sum-of-scores threshold, determining that the each first target object in the first image matches the each second target object in the second image respectively, and obtaining the result of association between the each first target object and the each second target object.

In one possible implementation, the method further includes:

in a case that the maximum sum of scores of association in the sums of scores of association is less than or equal to the sum-of-scores threshold, determining that the each first target object in the first image does not match the each second target object in the second image.

In one possible implementation, the obtaining, according to first input information and second input information, a first prediction result that indicates the position of the first target object in the second image includes:

performing feature extraction on the first input information to obtain a feature map corresponding to the first input information;

performing feature extraction on the second input information to obtain a feature map corresponding to the second input information; and obtaining, according to the feature map corresponding to the first input information and the feature map corresponding to the second input information, the first prediction result that indicates the position of the first target object in the second image.

In one possible implementation, the performing feature extraction on the first input information to obtain a feature map corresponding to the first input information includes:

performing feature extraction on the first input information by using a first network branch of a neural network to obtain the feature map of the first input information; and the performing feature extraction on the second input information to obtain a feature map corresponding to the second input information includes:

performing feature extraction on the second input information by using a second network branch of the neural network to obtain the feature map corresponding to the second input information, where the first network branch and the second network branch have a same network parameter and network structure.

In one possible implementation, the obtaining, according to the feature map corresponding to the first input information and the feature map corresponding to the second input information, the first prediction result that indicates the position of the first target object in the second image includes:

performing feature association on the feature map corresponding to the first input information and the feature map corresponding to the second input information to obtain a first associated feature map; and obtaining, based on the first associated feature map, the first prediction result that indicates the position of the first target object in the second image.

In one possible implementation, the acquiring a first attention map of a first target object includes:

determining a first image region of the first target object in the first image according to a detection result for the first target object in the first image; and determining the first attention map of the first target object according to the first image region and a second image region other than the first image region in the first image.

In one possible implementation, the determining a first image region of the first target object in the first image according to a detection result for the first target object in the first image includes:

acquiring a first initial image with an image size matching that of the first image;

setting a pixel value of pixels in a first image region in the first initial image as a first pixel value, where the first image region in the first initial image corresponds to the first image region in the first image; and setting a pixel value of pixels in a second image region in the first initial image as a second pixel value to obtain the first attention map of the first target object, where the second image region in the first initial image is a region other than the first image region in the first initial image, and the first pixel value is not equal to the second pixel value.

In one possible implementation, the acquiring a second mask image of the second image includes:

acquiring a second initial image with an image size matching that of the second image; and setting a pixel value of pixels in the second initial image as a third pixel value to obtain the second mask image.

In one possible implementation, the determining the first input information according to the first image and the first attention map includes:

fusing the first image with the first attention map to obtain the first input information.

In one possible implementation, the fusing the first image with the first attention map to obtain the first input information includes:

adding the first image with the first attention map in a set dimension to obtain the first input information, or splicing the first image with the first attention map in a set dimension to obtain the first input information.

In one possible implementation, the first image and the second image are obtained by capturing a same scene synchronously at different angles of view.

According to another aspect of the present disclosure, provided is an image processing apparatus, including:

a first acquisition module, configured to acquire a first image and a first attention map of a first target object in the first image, where the first attention map indicates the position of the first target object in the first image;

a second acquisition module, configured to acquire a second image and a second mask image of the second image, where pixel values of pixels in the second mask image are equal; and a first determination module, configured to obtain, according to first input information and second input information, a first prediction result that indicates the position of the first target object in the second image, where the first input information is determined according to the first image and the first attention map, and the second input information is determined according to the second image and the second mask image.

In one possible implementation, the apparatus further includes:

a third acquisition module, configured to acquire a second attention map of the second image according to a detection result for a second target object in the second image, where the second attention map indicates the position of the second target object in the second image;

a second determination module, configured to obtain, according to third input information and fourth input information, a first score of association that represents the degree of association between the first target object and the second target object, where the third input information is determined according to the second image and the second attention map, and the fourth input information is determined according to the second image and the first prediction result; and a third determination module, configured to determine a result of association between the first target object and the second target object according to the first score of association.

In one possible implementation, the apparatus further includes:

a fourth determination module, configured to obtain, according to the first input information and the third input information, a second score of association that represents the degree of association between the first target object and the second target object;

the third determination module, configured to determine a result of association between the first target object and the second target object according to the first score of association and the second score of association.

In one possible implementation, the apparatus further includes:

a fourth acquisition module, configured to acquire a second prediction result that indicates the position of the second target object in the first image;

a fifth determination module, configured to obtain, according to fifth input information and the first input information, a third score of association that represents the degree of association between the first target object and the second target object, where the fifth input information is determined according to the first image and the second prediction result; and the third determination module, configured to determine the result of association between the first target object and the second target object according to the first score of association and the third score of association.

In one possible implementation, the third determination module includes:

a first determination sub-module, configured to determine a final score of association between the first target object and the second target object according to the first score of association and the third score of association; and a second determination sub-module, configured to, in a case that the final score of association is greater than a score threshold, determine that the result of association indicates the first target object being potentially associated with the second target object.

In one possible implementation, the third determination module further includes:

a third determination sub-module, configured to, in a case that the final score of association is less than or equal to the score threshold, determine that the result of association indicates the first target object being not associated with the second target object.

In one possible implementation, the third determination module includes:

a fourth determination sub-module, configured to determine the final score of association between the first target object in the first image and the second target object according to the first score of association and the third score of association; and a matching sub-module, configured to match, according to a final score of association between each first target object in the first image and each second target object in the second image, the each first target object with the each second target object to obtain a result of association between the each first target object and the each second target object.

In one possible implementation, the matching sub-module includes:

a first determination unit, configured to determine a sum of scores of association between the each first target object and the each second target object according to the final score of association between the each first target object in the first image and the each second target object in the second image; and a second determination unit, configured to, in a case that the sum of scores of association is the maximum and greater than a predetermined sum-of-scores threshold, determine that the each first target object in the first image matches the each second target object in the second image respectively, and obtain the result of association between the each first target object and the each second target object.

In one possible implementation, the matching sub-module further includes:

a third determination unit, configured to, in a case that the maximum sum of scores of association in the sums of scores of association is less than or equal to the sum-of-scores threshold, determine that the each first target object in the first image does not match the each second target object in the second image.

In one possible implementation, the first determination module includes:

a first feature extraction sub-module, configured to perform feature extraction on the first input information to obtain a feature map corresponding to the first input information;

a second feature extraction sub-module, configured to perform feature extraction on the second input information to obtain a feature map corresponding to the second input information; and a prediction result determination sub-module, configured to obtain, according to the feature map corresponding to the first input information and the feature map corresponding to the second input information, the first prediction result that indicates the position of the first target object in the second image.

In one possible implementation, the first feature extraction sub-module is configured to perform feature extraction on the first input information by using a first network branch of a neural network to obtain the feature map of the first input information; and the second feature extraction sub-module is configured to perform feature extraction on the second input information by using a second network branch of the neural network to obtain the feature map corresponding to the second input information, where the first network branch and the second network branch have a same network parameter and network structure.

In one possible implementation, the prediction result determination sub-module includes:

a feature association unit, configured to perform feature association on the feature map corresponding to the first input information and the feature map corresponding to the second input information to obtain a first associated feature map; and a prediction result determination unit, configured to obtain, based on the first associated feature map, the first prediction result that indicates the position of the first target object in the second image.

In one possible implementation, the first acquisition module includes:

a region determination sub-module, configured to determine a first image region of the first target object in the first image according to a detection result for the first target object in the first image; and an attention map determination sub-module, configured to determine the first attention map of the first target object according to the first image region and a second image region other than the first image region in the first image.

In one possible implementation, the region determination sub-module includes:

a first acquisition unit, configured to acquire a first initial image with an image size matching that of the first image;

a first setting unit, configured to set a pixel value of pixels in a first image region in the first initial image as a first pixel value, where the first image region in the first initial image corresponds to the first image region in the first image; and a second setting unit, configured to set a pixel value of pixels in a second image region in the first initial image as a second pixel value to obtain the first attention map of the first target object, where the second image region in the first initial image is a region other than the first image region in the first initial image, and the first pixel value is not equal to the second pixel value.

In one possible implementation, the second acquisition module includes:

a second acquisition unit, configured to acquire a second initial image with an image size matching that of the second image; and a third setting unit, configured to set a pixel value of pixels in the second initial image as a third pixel value to obtain the second mask image.

In one possible implementation, the apparatus further includes:

an image fusion module, configured to fuse the first image with the first attention map to obtain the first input information.

In one possible implementation, the image fusion module includes:

an adding sub-module, configured to add the first image with the first attention map in a set dimension to obtain the first input information, or a splicing sub-module, configured to splice the first image with the first attention map in a set dimension to obtain the first input information.

In one possible implementation, the first image and the second image are obtained by capturing a same scene synchronously at different angles of view.

In one possible implementation,

According to one aspect of the present disclosure, provided is an electronic device, including:

a processor; and a memory configured to store processor-executable instructions, where the processor is configured to execute the foregoing image processing method.

According to one aspect of the present disclosure, provided is a computer-readable storage medium, having computer program instructions stored thereon, where when the computer program instructions are executed by a processor, the foregoing image processing method is implemented.

According to one aspect of the present disclosure, provided is a computer program, including a computer readable code, where when the computer readable code is running by an electronic device, the processor in the electronic device instructions for implementing the foregoing image processing method.

In embodiments of the present disclosure, a first image and a first attention map of a first target object in the first image may be acquired, a second image and a second mask image of the second image are acquired, and then a first prediction result that indicates the position of the first target object in the second image is obtained according to first input information and second input information, where the first input information is determined according to the first image and the first attention map, and the second input information is determined according to the second image and the second mask image. The first attention map indicates the position of the first target object in the first image, and pixel values of pixels in the second mask image are equal. In this way, the position of the first target object in the second image can be predicted, and thus an association between multiple images at different angles of view can be established, the range of the field of view is increased, and more comprehensive information of the current scene is obtained.

It should be understood that the above general description and the following detailed description are merely exemplary and explanatory, and are not intended to limit the present disclosure.

The other features and aspects of the present disclosure can be described more clearly according to the detailed descriptions of the exemplary embodiments in the accompanying drawings.

BRIEF DESCRIPTION OF THE DRAWINGS

The accompanying drawings here incorporated in the specification and constituting a part of the specification illustrate the embodiments consistent with the present disclosure and are intended to explain the technical solutions of the present disclosure together with the specification.

DETAILED DESCRIPTION

Figure 1:
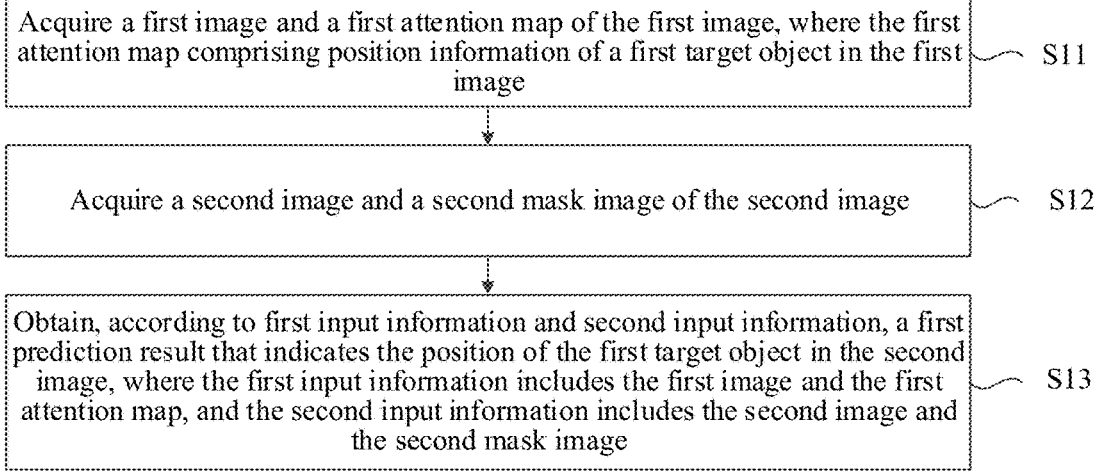
FIG. 1 shows a flowchart of an image processing method according to embodiments of the present disclosure.

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" as used herein merely describes an association relationship between associated objects, indicating that there may be three relationships, for example, A and/or B, which may indicate that A exists separately, both A and B exist, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included.

In addition, numerous details are given in the following detailed description for the purpose of better explaining the present disclosure. A person skilled in the art should understand that the present disclosure may also be implemented without some specific details. In some examples, methods, means, elements, and circuits well known to a person skilled in the art are not described in detail so as to highlight the subject matter of the present disclosure.

In solutions for image processing provided in the embodiments of the present disclosure, a first image and a first attention map of a first target object in the first image may be acquired, and a second image and a second mask image of the second image are acquired. The first attention map may indicate the position of the first target object in the first image, and pixel values of pixels in the second mask image are equal. Then a first prediction result that indicates the position of the first target object in the second image may be obtained according to first input information and second input information, where the first input information is determined according to the first image and the first attention map, and the second input information is determined according to the second image and the second mask image Because the first attention map may indicate the position of the first target object in the first image, the position of the first target object in the second image can be predicted by means of coaction of the first input information and the second input information, and then an association between multiple images at different angles of view can be established according to the first prediction result that indicates the position of the first target object in the second image, for example, in a top view and a side view for a same scene, the position of the first target object in the side view can be predicted by means of the position of the first target object in the top view, and more comprehensive information of the first target object can be obtained by means of image information at multiple angles of view.

In the related art, generally, target objects in multiple images are projected to a common vector space, and target objects associated with each other in different images are determined by calculating distances between projections of different target objects in the common vector space. In such a target association manner, when targets are projected to the common vector space, it is required to calibrate a projection matrix used by projection, while the projection matrix would be impacted by the pose of an image capture apparatus, i.e., a change in the pose of the image capture apparatus would cause matrix misalignment, and thus a large error exists in the obtained prediction result. However, in the solutions for image processing provided in the embodiments of the present disclosure, by using a first image and a first attention map as first input information, and using a second image and a second mask image as second input information, by means of the position of a first target object indicated by the first attention map, the position of the first target object in the second image can be predicted in combination with image information of the first target object in the first image and the second image, there is no need to project a target object to a common vector space, it is not required to calibrate a projection vector, the impact of an image capture apparatus on an obtained prediction result is low, and the accuracy of the prediction result can be improved.

The present disclosed embodiments can be applied to extended scenarios such as target labeling, object identification and image association and so on, for example, multiple images collected from different perspectives in the same scene can be correlated and it is possible to predict the position of an object in images from different perspectives, and for another example, the same target in multiple images can be labeled. The present disclosure does not limit specific application scenarios. The solutions for image processing provided in the embodiments of the present disclosure are described below through embodiments.

FIG. 1 shows a flowchart of an image processing method according to embodiments of the present disclosure. The image processing method may be executed by a terminal device, a server, or other information processing devices, where the terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. In some possible implementations, the image processing method may be implemented by a processor by invoking computer-readable instructions stored in a memory. The solutions for image processing in the embodiments of the present disclosure are described by taking an image processing apparatus as an execution subject.

As shown in FIG. 1, the image processing method includes the following steps.

At step S11, acquiring a first image and a first attention map of a first target object in the first image, where the first attention map indicates the position of the first target object in the first image.

In the embodiments of the present disclosure, at least two images captured by an image capture apparatus may be acquired. Each image may be derived from a same image capture apparatus, or may be derived from different image capture apparatuses. The first image may be one image arbitrarily selected from the at least two images. The first image may be one image arbitrarily selected from the at least two images Here, the first image may be a color image, where the color image can be understood as an image formed by superposing three colors, i.e., red (R), green (G), and blue (B).

In the embodiments of the present disclosure, the image capture apparatus may acquire the first attention map of the first target object in the first image. The first attention map may indicate the position of the first target object in the first image, the first target object may be any target object in the first image, for example, multiple target objects, such as a human face, a table and chair, and a potted plant, that may be included in the first image, and one of the multiple target objects, such as the human face, may be used as the first target object. Here, the image capture apparatus may obtain the first attention map according to the position of the first target object in the first image, or the first attention map may be acquired directly by other devices.

In one possible implementation, a first image region of the first target object in the first image may be determined according to a detection result for the first target object in the first image, and then the first attention map of the first target is determined according to the first image region and a second image region other than the first image region in the first image.

In this implementation, target detection may be performed on the first image to obtain a detection result, each detection result corresponds to one target object, there may be multiple detection results, and any one of the detection results may be used as the detection result for the first target object. Here, the detection result may be represented by a detection box. One detection result may correspond to one attention map, and thus interference occurring between the multiple detection results can be decreased. A first image region of the first target object, annotated by the detection box, in the first image is determined according to a detection box corresponding to one detection result, where the first image region may be an enclosed image region. Then the first attention map of the first image may be obtained according to the determined first image region and a second image region other than the first image region, for example, a pixel value of pixels in the first image region may be copied and a pixel value in the second image region is changed, or the copied pixel value of the pixel in the first image region is adjusted, so that the pixel value in the first image is obviously different from the pixel value in the second image region, and thus the first attention map may be obtained. Thus, the image region where the first target object is located in the first attention map is different from other image regions, and by providing position information of the first target object in the first image, the accuracy of an obtained first prediction result that indicates the position of the first target object in the second image can be improved.

In one example of this implementation, a first initial image with an image size matching that of the first image may be acquired, and then a pixel value of pixels in the first image region in the first initial image is set as a first pixel value, and a pixel value of pixels in the second image region in the first initial image is set as a second pixel value to obtain the first attention map of the first target object. The first image region in the first initial image corresponds to the first image region in the first image, the second image region in the first initial image is a region other than the first image region in the first initial image, and the first pixel value is not equal to the second pixel value.

In this example, a first initial image may be generated, and the first initial image has a same image size as that of the first image. Alternatively, the first image region of the first image may be copied to obtain a first initial image. The image size of the first initial image matches that of the first image, i.e., it can be understood that the first initial image may have a same size as that of the first image, for example, the image size of the first image is 3×3 cm, and then the image size of the first initial image is also 3×3 cm. The first initial image may include a first image region, the first image region in the first initial image corresponds to the first image region in the first image, i.e., it can be understood that the image position of the first image region in the first initial image may be the same as the image position of the first image region in the first image, for example, a pixel value corresponding to white. The pixel value in the first image region is set as a predetermined first pixel value, and the first pixel value may be the same as the pixel value of the pixel in the first image region. The second image region may be an image region that does not include the first image region in the first initial image, and the pixel value in the second image region may be set as the second pixel value. The second pixel value may be a predetermined pixel value, for example, a pixel value corresponding to black, the second pixel value is different from the first pixel value, and thus, the second image region can be distinguished from the first image region through the pixel value of the pixel.

In such a manner, the first attention map corresponding to the first target object can be obtained, and the first attention map can display an image region corresponding to the first target object.

In another example, the pixel value in the first image region may be set to be the same as the pixel value in the first image region of the first image, and if the first image is a color image, the first image region may be a color image region. In such a manner, the first attention map of the first target object in the first image is obtained, not only position information of the first target object but also color information of the first target object may be included, and thus the accuracy of the position of the first target object in the second image can be improved.

For example, the pixel value of the pixel in the first image region of the first initial image may be set to be 1, the pixel value of the pixel in the second image region may be set to be 0, and thus the first attention map of the first target can be obtained. Alternatively, the pixel value of the pixel in the first image region of the first image may be copied to the first image region of the first initial image, and the pixel value of the pixel in the second image region may be set to be 0, so as to obtain the first attention map.

At step S12, a second image and a second mask image of the second image are acquired, where pixel values of pixels in the second mask image are equal.

In the embodiments of the present disclosure, the second image may be any one of the at least two images captured by the image capture apparatus. The approach for acquiring the second image may be the same as or may be different from the approach for acquiring the first image in step S11, and details are not described herein repeatedly. The image size of the second mask image may be the same as that of the second image, and the pixel values of the pixels in the second mask image may be the same, i.e., the pixels may have a same pixel value, a shielding effect can be achieved, no position information is provided. Here, the second mask image may be obtained based on the image size of the second image, or the second mask image may be acquired by other devices.

A second initial image with an image size matching that of the second image may be acquired, and then a pixel value of pixels in the second initial image is set as a third pixel value to obtain the second mask image In this implementation, a second initial image with an image size matching that of the second image is acquired, and a pixel value of pixels in the second initial image is set as a predetermined third pixel value, for example, the pixel value of the pixel in the second initial image is set as a pixel value corresponding to black, to obtain the second initial image. The second initial image can achieve a shielding effect.

At step S13, a first prediction result that indicates the position of the first target object in the second image is obtained according to first input information and second input information, where the first input information is determined according to the first image and the first attention map, and the second input information is determined according to the second image and the second mask image.

In the embodiments of the present disclosure, a first image and a first attention map may be used as first input information, and a second image and a second mask image may be used as second input information, and then feature extraction may be performed on the first input information and the second input information by using a trained first neural network to obtain a first prediction result that indicates the position of the first target object in the second image. The first prediction result may be an image, and the position of the first target object in the second image may be determined by means of the pixel value of the pixel in the image. For example, the pixel value of the pixel in the image may be detected, and if the pixel value of the pixel in a certain image region is a predetermined first pixel value, for example, the pixel in a certain image region is white, it can be determined that the image position of the image region in the image corresponds to the image position of the first target object in the second image.

In one possible implementation, the first image may be fused with the first attention map to obtain the first input information.

In this implementation, the first image is fused with the first attention map to obtain the first input information. The first input information may be used as an input of a neural network. By fusing the first image with the first attention map, image information from two images can be combined better, and extracted image features can be more accurate.

In one example, the first image may be added with the first attention map in a set dimension to obtain the first input information, or the first image may be spliced with the first attention map in a set dimension to obtain the first input information.

In this example, adding the first image with the first attention map in a set dimension may be adding the first image with the first attention map in dimension of depth, i.e., dimension of channel. Here, the number of channels corresponds to the dimension of depth of the image. The first image and the first attention map may have a same number of channels, for example, the first image and the first attention map may both be RGB images, and both have three channels. Alternatively, the first image and the first attention map may have different numbers of channels, for example, the first image has three channels and the first attention map has one channel. The first image is added with the first attention map in dimension of depth, R values, G values, and B values of pixels on corresponding positions of two images may be added together, or when the first image has three channels, while the first attention map has one channel, the R value of the pixel of the first image on the corresponding position is added with the pixel value of the pixel of the first attention map to obtain first input information, and the number of channels of the first input information is the same as the number of channels of the first image.

In this example, the splicing the first image with the first attention map in a set dimension can be understood as splicing the first image with the first attention map in image length, image width, or dimension of depth, i.e., dimension of channel (such as three channels, i.e., RGB), by taking splicing in dimension of depth as an example, that is, the first image is spliced with the first attention mage in dimension of depth to form a six-channel image, and the image size of an obtained to-be-processed image may be a sum of the sizes of the first image and the first attention map in the set dimension. Here, in a case that the first image and the first attention map have a same depth, the first attention map provides not only the position information of the first target object but also image features of the first target object, so that the feature maps extracted by the neural network have more accurate and comprehensive image features.

In one possible implementation, the first input information may be processed by using a first network branch of the first neural network to obtain a feature map corresponding to the first input information of the first network branch, and the second input information is processed by using a second network branch of the first neural network to obtain a feature map corresponding to the second input information of the second network branch. Then feature association is performed on the feature map corresponding to the first input information and the feature map corresponding to the second input information to obtain a first associated feature map, and the first prediction result that indicates the position of the first target object in the second image is obtained based on the first associated feature map.

It should be noted that the foregoing method for obtaining the first input information may be the same as or different from the method for obtaining the second input information, and details are not described herein repeatedly.

In one possible implementation, feature extraction may be performed on the first input information to obtain the feature map corresponding to the first input information, feature extraction may be performed on the second input information to obtain the feature map corresponding to the second input information, and then the first prediction result that indicates the position of the first target object in the second image is obtained according to the feature map corresponding to the first input information and the feature map corresponding to the second input information.

In this implementation, the first input information and the second input information may be used as input information of the neural network, feature extraction is performed on the first input information and the second input information separately by using the neural network, and thus the feature map corresponding to the first input information and the feature map corresponding to the second input information may be obtained. Then the first prediction result that indicates the position of the first target object in the second image may be obtained according to the feature map corresponding to the first input information and the feature map corresponding to the second input information. By performing feature extraction on the first input information and the second input information, a difference between different input information can be compared better, and the first prediction result can be more accurate.

In one example of this implementation, feature extraction may be performed on the first input information by using the first network branch of the neural network to obtain the feature map of the first input information, and feature extraction may be performed on the second input information by using the second network branch of the neural network to obtain the feature map of the second input information. The first network branch and the second network branch have a same network parameter and network structure.

In this implementation, the neural network may be a first neural network, the first neural network may include at least two network branches, and one network branch may correspond to one piece of input information. The first network branch and the second network branch may be any two network branches of the first neural network. The first input information may be used as an input of the first network branch, and the second input information may be used as an input of the second network branch. The first network branch may include a feature extraction layer, and feature extraction may be performed on the first input information by using the feature extraction layer of the first network branch to obtain the feature map of the first input information. Accordingly, the second network branch may include a feature extraction layer, and feature extraction may be performed on the second input information by using the feature extraction layer of the second network branch to obtain the feature map corresponding to the second input information. Here, the first network branch and the second network branch having a same network parameter and network structure can be understood as the first network branch and the second network branch sharing the network parameter, and thus the speed of training the first neural network can be increased. For example, it is assumed that each network branch of the first neural network includes network layers such as a number-of-channels reduction layer and a feature extraction layer, the number-of-channels reduction layers of the network branches may have a same network parameter, and the feature extraction layers of the network branches may have different network parameters.

In one example of this implementation, feature association may be performed on the feature map corresponding to the first input information and the feature map corresponding to the second input information to obtain a first associated feature map, and the first prediction result that indicates the position of the first target object in the second image is obtained based on the first associated feature map.

In this example, the first neural network may include network layers such as an association layer and a regression layer, feature association may be performed on the feature map corresponding to the first input information and the feature map corresponding to the second input information to obtain a first associated feature map, then multiple convolutions, batch normalization, linear rectification, and full connection may be performed on the first associated feature map, an output of the first neural network may be obtained, the output of the first neural network may be the first prediction result, or further processing may be performed on the output of the first neural network to obtain the first prediction result. Here, in addition to the image information of the first target object, the first image includes an image region surrounding the first target object, and thus more comprehensive image features can be obtained from the first input information formed by the first image In addition, the first input information further includes the first attention map, the first attention map may provide image position information of the first target object, and thus, more accurate first prediction result can be obtained.

Figure 2:
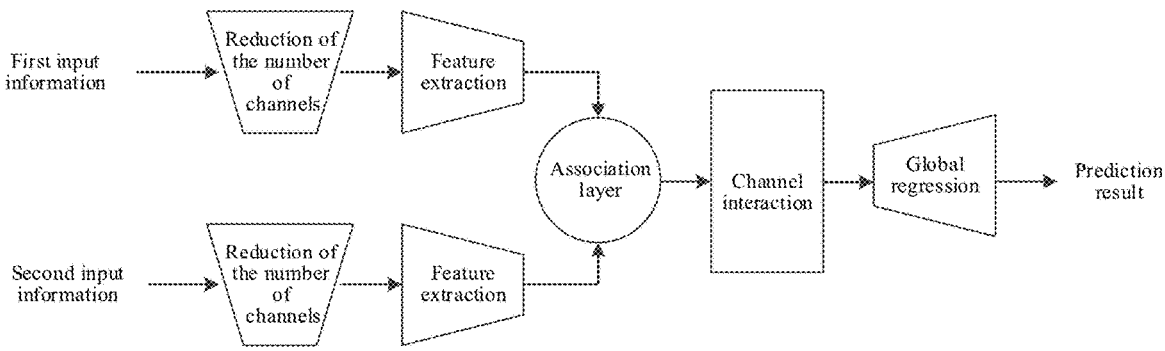
FIG. 2 shows a block diagram of an example of obtaining a first prediction result by using a first neural network according to embodiments of the present disclosure.
Figure 3:
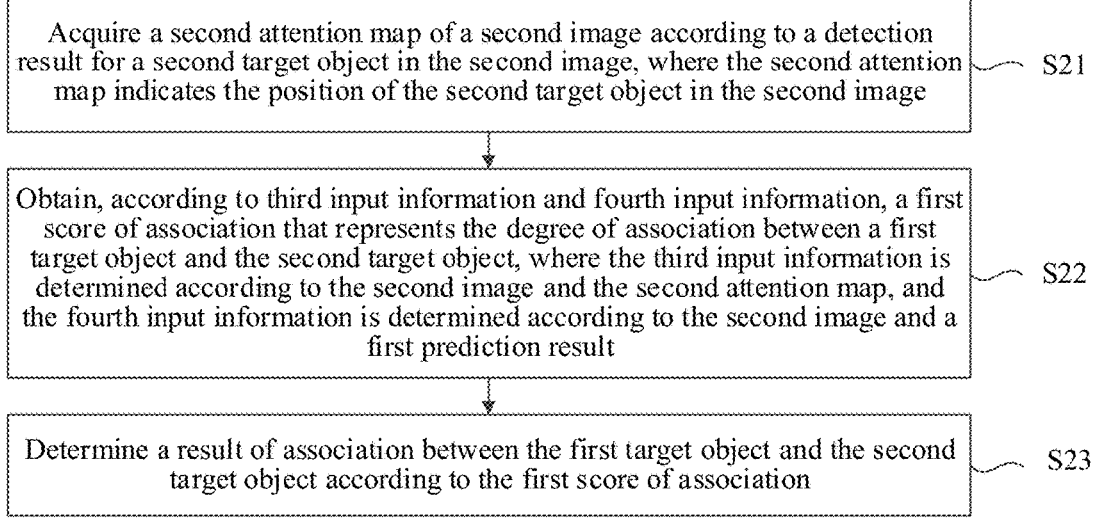
FIG. 3 shows a flowchart of determining a result of association between a first target object and a second target object according to embodiments of the present disclosure.

FIG. 2 shows a block diagram of an example of obtaining a first prediction result by using a first neural network according to embodiments of the present disclosure.

In one example, multiple image capture apparatuses may photograph a same scene synchronously, a first image capture apparatus and a second image capture apparatus may be any two of the multiple image capture apparatuses, where an image captured by the first image capture apparatus may be a first image, and an image captured by the second image capture apparatus may be a second image. Target detection may be performed separately on the first image and the second image to obtain target detection results of the first image and the second image. An image processing apparatus may acquire a first image and a first attention map, and acquire a second image and a second mask image, then may input the first image and the first attention map to a first network branch of a first neural network, and inputs the second image and the second mask image to a second network branch of the first neural network. By taking the process of the first network branch as an example, the first image and the first attention map may be spliced in dimension of depth to obtain first input information, where the first image corresponds to three channels, the first attention map corresponds to one channel, the first input information corresponds to four channels, and each channel corresponds to one depth. Then convolution processing may be performed on the first input information by using the first network branch, the number of channels of the first input information is reduced from four to three, and then feature extraction is performed to obtain a feature map corresponding to the first input information of the first network branch, where the feature map corresponding to the first input information may be a tensor having three dimension features, and the three dimension features may include a length feature, a width feature, and a depth feature. During the feature extraction, multiple convolution processing may be performed. A feature map corresponding to second input information of the second network branch can be obtained in a same processing manner. Then a first associated feature map can be obtained by associating the feature map corresponding to the first input information and the feature map corresponding to the second input information by using an association layer of the first neural network. When the feature map corresponding to the first input information is associated with the feature map corresponding to the second input information, the following formula (1) can be used:

$$c_{AB}(i, j, k) = f_{B(i,j)}{}^T f_{A(i_k, j_k)},  \qquad \text{Formula (1)}$$

where $c_{AB}$ may represent the first associated feature map, and $c_{AB} \in \mathbb{R}^{h \times w \times (h \times w)}$, where $\mathbb{R}^{h \times w \times (h \times w)}$ represents a set of real numbers. $f_A$ is a feature vector of the feature map corresponding to the first input information; $f_S$ is a feature vector of the feature map corresponding to the second input information; i represents a row of the feature map corresponding to the first input information and the feature map corresponding to the second input information, and corresponds to a length feature; j represents a column of the feature map corresponding to the first input information and the feature map corresponding to the second input information, and corresponds to a width feature, and both i and j are positive integers; k represents an index corresponding to the row and the column, for example, k∈{1, 2, 3 . . . , i×j}; and h×w×(h×w) represents three dimension features of the first associated feature map. Then processing such as channel interaction and global regression is performed on the first associated feature map, in the channel interaction, one-step extraction may be performed on image features in the first associated feature map, and a depth feature of the first associated feature map, on which channel interaction is performed, is controlled within a certain depth, for example, a depth of 64. After the processing such as channel interaction and global regression, an image can be obtained, and an image region, where a pixel in the image is white, may indicate the position of a first target object in the second image. The global regression processing here may include multiple convolution processing, batch normalization processing, linear rectification processing, and full connection layer processing.

where $c_{AB}$ may represent the first associated feature map, and $c_{AB} \in \mathbb{R}^{h \times w \times (h \times w)}$, where $\mathbb{R}^{h \times w \times (h \times w)}$ represents a set of real numbers. $f_A$ is a feature vector of the feature map corresponding to the first input information; $f_S$ is a feature vector of the feature map corresponding to the second input information; i represents a row of the feature map corresponding to the first input information and the feature map corresponding to the second input information, and corresponds to a length feature; j represents a column of the feature map corresponding to the first input information and the feature map corresponding to the second input information, and corresponds to a width feature, and both i and j are positive integers; k represents an index corresponding to the row and the column, for example, k∈{1, 2, 3 . . . , i×j}; and h×w×(h×w) represents three dimension features of the first associated feature map. Then processing such as channel interaction and global regression is performed on the first associated feature map, in the channel interaction, one-step extraction may be performed on image features in the first associated feature map, and a depth feature of the first associated feature map, on which channel interaction is performed, is controlled within a certain depth, for example, a depth of 64. After the processing such as channel interaction and global regression, an image can be obtained, and an image region, where a pixel in the image is white, may indicate the position of a first target object in the second image. The global regression processing here may include multiple convolution processing, batch normalization processing, linear rectification processing, and full connection layer processing. At step S21, a second attention map of the second image is acquired according to a detection result for a second target object in the second image, where the second attention map indicates the position of the second target object in the second image.

Here, the detection result for the second target object in the second image may be acquired, and the detection result may include the position of the second target object. The second target object may be any one target object in the second image. The second attention map of the second image may be acquired according to the detection result for the second target object in the second image. The approach for obtaining the second attention map may be the same as or different from the approach for obtaining the first attention map, and details are not described herein repeatedly. The second attention map may include position information of the second target object in the second image. Here, in addition to an image capture apparatus, other devices can directly acquire the second attention map of the second image.

At step S22, a first score of association that represents the degree of association between the first target object and the second target object is obtained according to third input information and fourth input information, where the third input information is determined according to the second image and the second attention map, and the fourth input information is determined according to the second image and the first prediction result.

In the embodiments of the present disclosure, the second image may be fused with the second attention map to obtain third input information, the second image may be fused with the first prediction result to obtain fourth input information, and the third input information and the fourth input information are processed by using a trained second neural network to obtain the first score of association between the first target object and the second target object. The first score of association may represent the degree of association between the first target object and the second target object. Here, the method for obtaining the second attention map may be the same as or different from the method for obtaining the first attention map, the process of fusing the second image with the second attention map may be the same as or different from the process of fusing the first image with the first attention map, and details are not described herein repeatedly.

In one possible implementation, the third input information may be processed by using a third network branch of the second neural network to obtain a feature map corresponding to the third input information, and the fourth input information may be processed by using a fourth network branch of the second neural network to obtain a feature map corresponding to the fourth input information. Then feature association is performed on the feature map corresponding to the third input information and the feature map corresponding to the fourth input information to obtain a second associated feature map, and the first score of association that represents the degree of association between the first target object and the second target object is obtained based on the second associated feature map.

In this implementation, the second neural network may include at least two network branches, and one network branch may correspond to one piece of input information. The third network branch and the fourth network branch may be any two network branches of the second neural network. The first input information may be used as an input of the third network branch, and the third input information may be used as an input of the second network branch. The third network branch may include a feature extraction layer, and feature extraction may be performed on the first input information by using the feature extraction layer of the third network branch to obtain the feature map corresponding to the third input information. Accordingly, the fourth network branch may include a feature extraction layer, and feature extraction may be performed on the third input information by using the feature extraction layer of the fourth network branch to obtain the feature map corresponding to the fourth input information. The second neural network may include network layers such as an association layer and a regression layer, feature association may be performed on the feature map corresponding to the third input information and the feature map corresponding to the fourth input information to obtain the second associated feature map, then multiple convolutions, batch normalization, linear rectification, and full connection may be performed on the second associated feature map, an output of the second neural network may be obtained, the output of the second neural network may be the first score of association, or further processing may be performed on the output of the second neural network to obtain the first score of association. The first score of association is high, and it can be indicated that an association relationship exists between the first target object and the second target object in the second image indicated by the first prediction result, i.e., it can be understood that if two target objects are a same target object, an image position predicted for the target object is close to an actual image position of the target object, and thus the first score of association is large. Otherwise, a difference in the image position predicted for the target object and the actual image position of the target object is large, and thus the first score of association is small.

At step S23, a result of association between the first target object and the second target object is determined according to the first score of association.

In the embodiments of the present disclosure, the result of association between the first target object and the second target object may be determined according to the first score of association, for example, whether the first target object and the second target object are a same target object may be determined according to the first score of association, and in a case that the first score of association is greater than a predetermined score threshold, it can be considered that the result of association indicates the first target object and the second target object being a same target object. In a case that the first score of association is less than or equal to the predetermined score threshold, it can be considered that the result of association indicates no association relationship existing between the first target object and the second target object.

In one example, the second image, the second attention map, and the first prediction result may be acquired. Then the second image and the second attention map are input to the third network branch of the second neural network, and the second image and the first prediction result are input to the fourth network branch of the second neural network. By taking the process of the third network branch as an example, the second image and the second attention map may be spliced in dimension of depth to obtain the third input information, where the second image corresponds to three channels, the second attention map corresponds to one channel, the third input information corresponds to four channels, and each channel corresponds to one depth. Then convolution processing may be performed on the third input information by using the third network branch, the number of channels of the third input information is reduced from four to three, and then feature extraction is performed to obtain the feature map corresponding to the third input information of the third network branch, where the feature map corresponding to the third input information may be a tensor having three dimension features, and the three dimension features may include a length feature, a width feature, and a depth feature. During the feature extraction, multiple convolution processing may be performed. The feature map corresponding to the fourth input information of the fourth network branch may be obtained in a same processing manner.

Then the second associated feature map can be obtained by associating the feature map corresponding to the third input information and the feature map corresponding to the fourth input information by using an association layer of the second neural network. When the feature map corresponding to the third input information is associated with the feature map corresponding to the fourth input information, the second associated feature map can be obtained by using the above formula (1). Then the score of association between the first target object and the second target object may be obtained by performing global regression processing on the second associated feature map. The global regression processing here may include multiple convolution processing, batch normalization processing, linear rectification processing, and full connection layer processing.

In one example, a second result of association that represents the degree of association between the first target object and the second target object may be obtained according to the first input information and the third input information, and then the result of association between the first target object and the second target object is determined according to the first score of association and the second score of association.

In this example, in order to ensure the accuracy of the result of association, multiple neural networks can be combined together, so as to determine the result of association between the first target object and the second target object. That is, feature extraction may be performed on the first input information and the third input information by using a third neural network to obtain the feature map corresponding to the first input information and the feature map corresponding to the third input information, then feature association is performed on the feature map corresponding to the first input information and the feature map corresponding to the third input information to obtain a third associated feature map, and then the second result of association that represents the degree of association between the first target object and the second target object may be obtained based on the third associated feature map. The degree of association can be understood as a possibility that the first target object and the second target object represents a same target object. Here, the network structure and process of the third neural network are the same as those of the second neural network, and details are not described herein repeatedly. After the second score of association is obtained, the result of association between the first target object and the second target object may be determined according to the first score of association and the second score of association, for example, weighted averaging is performed on the first score of association and the second score of association to determine a final score of association, and then result of association between the first target object and the second target object is determined according to the final score of association.

In one example, a second prediction result that indicates the position of the second target object in the first image, and then a third score of association that represents the degree of association between the first target object and the second target object is obtained according to fifth input information and the first input information, where the fifth input information is determined according to the first image and the second prediction result. Then the result of association between the first target object and the second target object is determined according to the first score of association and the third score of association.

In this example, the second prediction result may be determined according to the second image and the second attention map in the second image, and the first image and the first mask image. The process of determining the second prediction result may be the same as or different from the process of determining the first prediction result, and details are not described herein repeatedly. The second prediction result and the first image may be used as the fifth input information, or the second prediction result may be fused with the first image to obtain the fifth input information. Then the fifth input information and the first input information may be input to a fourth neural network, and the third score of association may be obtained according to an output of the fourth neural network. Here, the network structure of the fourth neural network may be the same as that of the second neural network, and details are not described herein repeatedly. The third score of association may represent the degree of association between the second prediction result and the first target object. The third score of association is high, and it can be indicated that an association relationship exists between the second target object and the first target object in the first image indicated by the second prediction result. Then an accurate result of association between the first target object and the second target object may be obtained by means of both the first score of association and the third score of association, for example, an average value or maximum value of the first score of association and the third score of association may be calculated, and the result of association between the first target object and the second target object may be determined according to the average value or maximum value.

Figure 4:
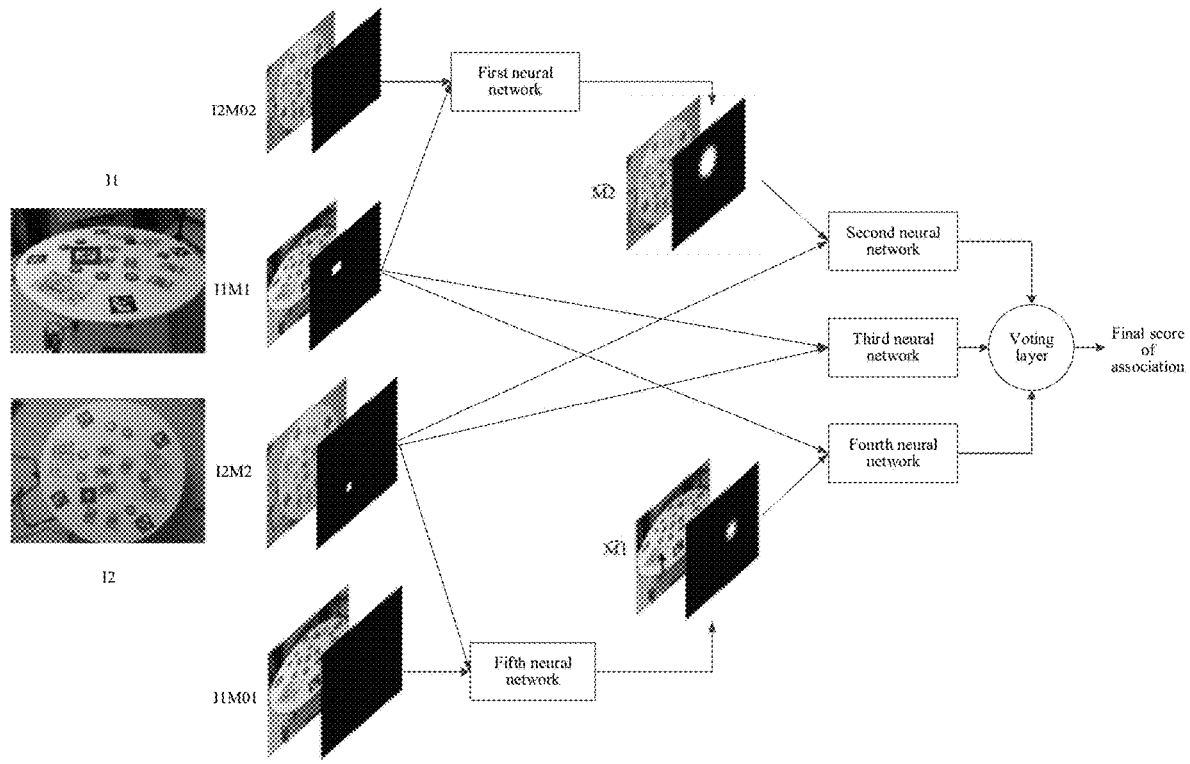
FIG. 4 shows a block diagram of an example of obtaining a result of association according to embodiments of the present disclosure.

FIG. 4 shows a block diagram of an example of obtaining a result of association according to embodiments of the present disclosure. A first image may be represented by I1, a first attention map of the first image may be represented by M1, and a first mask image of the first image may be represented by M01. A second image may be represented by I2, a second attention map of the second image may be represented by M2, and a second mask image of the second image may be represented by M02. The first image I1 and the first attention map M1 may be first input information, and the second image I2 and the second mask image M02 may be second input information, and a first neural network may be represented by Mask1. The first input information and the second input information are input into the first neural network Mask1, a first prediction result can be obtained, where the first prediction result may be represented by $\widetilde{M1}$. The second image and the second attention map may be third input information, the first prediction result and the second image may be fourth input information, the fourth input information and the third input information are input into a second neural network Association 1, and a first score of association can be obtained. The first input information and the third input information are input into a third neural network Association 2, and a second score of association can be obtained. The third input information and the fourth input information are input into a fifth neural network Mask2, and a second prediction result $\widetilde{M2}$ can be obtained. The second prediction result $\widetilde{M2}$ may be used as fifth input information, the first input information and the fifth input information are input into a fourth neural network Association 3, a third score of association can be obtained. Then the first score of association, the second score of association, and the third score of association are input into a voting layer, where the voting layer may be a full connection layer, a final score of association may be obtained by means of the voting layer, and a result of association between a first target object and a second target object may be obtained according to the final score of association.

It should be noted that the network structure of the first neural network and the network structure of the second neural network can be arbitrarily combined. FIG. 4 merely exemplarily shows a possible combination mode, and the specific combination mode is not limited in the embodiments of the present disclosure.

In one example, the final score of association between the first target object and the second target object is determined according to the first score of association and the third score of association, and in a case that the final score of association is greater than a score threshold, it is determined that the result of association indicates the first target object being potentially associated with the second target object.

In this example, a final score of association can be obtained according to multiple scores of association, and the final score of association can accurately present the degree of association between the first target object and the second target object. The final score of association may be an average value or maximum value of the first score of association and the third score of association, and the first score of association and the third score of association may be input to a full connection layer of a neural network to obtain the final score of association. Then the result of association between the first target object and the second target object is determined according to the final score of association. The final score of association is high, and it can be indicated that the degree of association between the first target object and the second target object is large; and the final score of association is low, and it can be indicated that the degree of association between the first target object and the second target object is small. In this example, the final score of association may be compared with a predetermined score threshold, and if the obtained score of association is greater than the score threshold, it can be considered that two target detection results are potentially associated, i.e., two targets may represent a same target. In such a manner, whether two target objects represent a same target object can be quickly determined according to the final score of association.

In one example, in a case that the final score of association is less than or equal to the score threshold, it is determined that the result of association indicates the first target object being not associated with the second target object.

In this example, if the obtained final score of association is less than or equal to the predetermined score threshold, it can be considered that no association relationship exists between the two target objects, i.e., the first target object and the second target object do not represent a same target object. In such a manner, whether the two target objects are not a same target object can be quickly determined according to the score of association between any two target objects.

In one example, the final score of association may be determined according to the first score of association, the second score of association, and the third score of association. For example, weighted averaging is performed on the first score of association, the second score of association, and the third score of association to obtain the final score of association.

In one example, the final score of association between the first target object and the second target object may be determined according to the first score of association and the third score of association, and each first target in the first image is matched with each second target object in the second image according to a final score of association between the each first target object and the each second target object to obtain a result of association between the each first target object and the each second target object.

In this example, because the first image and the second image each may include multiple target objects, where a certain first target object in the first image is potentially associated with multiple second target objects in the second image, but in fact, one first target object corresponds to one second target object. Therefore, multiple first target objects may be globally matched with multiple second target objects according to the final score of association between the first target object and the second target object, so that one first target is matched with one second target object, and successfully matched first target object and second target object can be considered to be a same target object.

In this example, a sum of scores of association between the each first target object in the first mage and the each second target object in the second image may be determined according to the final score of association between the each first target object and the each second target object, and in a case that the sum of scores of association is the maximum and greater than a predetermined sum-of-scores threshold, it is determined that the each first target object in the first image matches the each second target object in the second image respectively, and the result of association between the each first target object and the each second target object is obtained.

In this example, targets in two images are matched in a manner of calculating a sum of final scores of association between the each first target object and the each second target object. That is, multiple targets in the first image are respectively matched with multiple targets in the second image, and then the sum of scores of association is obtained according to calculated final scores of association between matched target pairs. In a case that the sum of scores of association is the maximum, it can be considered that the each first target object in the first image is optimally matched with the each second target object in the second image, and if the maximum sum of scores of association is greater than the predetermined sum-of-scores threshold, it can be considered that the multiple target objects in the first image respectively match the multiple target objects in the second image Thus, target objects in different images can be optimally matched.

In this example, in a case that the maximum sum of scores of association in the sums of scores of association is less than or equal to the sum-of-scores threshold, it is determined that the each first target object in the first image does not match the each second target object in the second image.

Here, if the maximum sum of scores of association is less than or equal to the predetermined sum-of-scores threshold, it can be considered that in a case that the multiple first target objects in the first image are optimally matched with the multiple second target objects in the second image, the maximum sum of scores of association does not reach the predetermined sum-of-scores threshold, it can be considered that the multiple first target objects in the first image do not in one-to-one correspondence to the multiple second target objects in the second image, and the first image and the second image are not images captured for a same scene, for example, the first image and the second image include some same target objects or include some different target objects, or the target objects in the first image and the second image are completely different.

For example, it is assumed that three first target objects, which are A, B, and C respectively, exist in the first image, and three second target objects, which are a, b, and c respectively, exist in the second image. The score of association between A in the first image and a in the second image may be represented by Aa. The sum of scores of association between the each first target object and the each second target object may be obtained by randomly pairing three first target objects in the first image with three second target objects in the second image, and then adding final scores of association between targets pairwise, and after random pairing each time, one second target object in the second image is allocated to one first target object in the first image That is, Aa, Bb, and Cc correspond to one random pairing, Aa, Bc, and Cb correspond to one random pairing, Ab, Ba, and Cc correspond to one random pairing, Ab, Bc, and Ca correspond to one random pairing, Ac, Ba, and Cb correspond to one random pairing, and Ac, Bb, and Ca correspond to one random pairing, where one random pairing when the sum of the final scores of association is the maximum is selected, the sum of the final scores of association between randomly paired targets may be the maximum sum-of-scores of association.

It should be noted that, when the multiple first target objects are paired with the multiple second target objects, a specific matching method is not limited in the present disclosure, here multiple first target objects in a first image are paired to multiple second target objects in a second image by using some related algorithms, for example, a greedy algorithm or Hungarian algorithm, so that the target objects in the different images are optimally matched.

In one possible implementation, the first image and the second image are obtained by capturing a same scene synchronously at different angles of view. Here, multiple image capture apparatuses may photograph a same scene synchronously at different angles of view, the angle and position of each image capture apparatus are different, and thus images obtained by photographing the same scene at different angles can be obtained, for example, a main view and a top view of a same object. The same targets in the images synchronously captured by the multiple image capture apparatuses are matched according to a result of association between target objects in the first image and the second image, for example, the same targets in different images are annotated with the same number, color or shape or the like, so as to implement association between the same target objects in the different images.

It can be understood that the foregoing various method embodiments mentioned in the present disclosure may be combined with each other to form a combined embodiment without departing from the principle logic. Details are not described herein repeatedly due to space limitation.

In addition, the present disclosure further provides an image processing apparatus, an electronic device, a computer-readable storage medium, and a program, which can all be configured to implement any one of the image processing methods provided in the present disclosure. For corresponding technical solutions and descriptions, please refer to the corresponding content in the method section. Details are not described repeatedly.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

Figure 5:
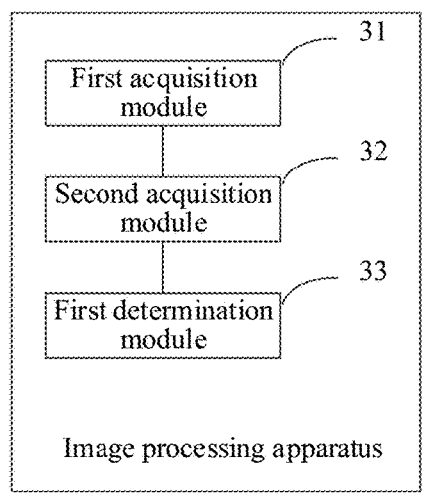
FIG. 5 shows a block diagram of an image processing apparatus according to embodiments of the present disclosure.

FIG. 5 shows a block diagram of an image processing apparatus according to embodiments of the present disclosure. As shown in FIG. 5, the image processing apparatus includes:

a first acquisition module 31, configured to acquire a first image and a first attention map of a first target object in the first image, where the first attention map indicates the position of the first target object in the first image;

a second acquisition module 32, configured to acquire a second image and a second mask image of the second image, where pixel values of pixels in the second mask image are equal; and a first determination module 33, configured to obtain, according to first input information and second input information, a first prediction result that indicates the position of the first target object in the second image, where the first input information is determined according to the first image and the first attention map, and the second input information is determined according to the second image and the second mask image.

In one possible implementation, the apparatus further includes:

a third acquisition module, configured to acquire a second attention map of the second image according to a detection result for a second target object in the second image, where the second attention map indicates the position of the second target object in the second image;

a second determination module, configured to obtain, according to third input information and fourth input information, a first score of association that represents the degree of association between the first target object and the second target object, where the third input information is determined according to the second image and the second attention map, and the fourth input information is determined according to the second image and the first prediction result; and a third determination module, configured to determine a result of association between the first target object and the second target object according to the first score of association.

In one possible implementation, the apparatus further includes:

a fourth determination module, configured to obtain, according to the first input information and the third input information, a second score of association that represents the degree of association between the first target object and the second target object; and the third determination module, configured to determine a result of association between the first target object and the second target object according to the first score of association and the second score of association.

In one possible implementation, the apparatus further includes:

a fourth acquisition module, configured to acquire a second prediction result that indicates the position of the second target object in the first image;

a fifth determination module, configured to obtain, according to fifth input information and the first input information, a third score of association that represents the degree of association between the first target object and the second target object, where the fifth input information is determined according to the first image and the second prediction result;

the third determination module, configured to determine the result of association between the first target object and the second target object according to the first score of association and the third score of association.

In one possible implementation, the third determination module includes:

a first determination sub-module, configured to determine a final score of association between the first target object and the second target object according to the first score of association and the third score of association; and a second determination sub-module, configured to, in a case that the final score of association is greater than a score threshold, determine that the result of association indicates the first target object being potentially associated with the second target object.

In one possible implementation, the third determination module further includes:

a third determination sub-module, configured to, in a case that the final score of association is less than or equal to the score threshold, determine that the result of association indicates the first target object being not associated with the second target object.

In one possible implementation, the third determination module includes:

a fourth determination sub-module, configured to determine the final score of association between the first target object in the first image and the second target object according to the first score of association and the third score of association; and a matching sub-module, configured to match, according to a final score of association between each first target object in the first image and each second target object in the second image, the each first target object with the each second target object to obtain a result of association between the each first target object and the each second target object.

In a possible implementation, the matching sub-module includes:

a first determination unit, configured to determine a sum of scores of association between the each first target object and the each second target object according to the final score of association between the each first target object in the first image and the each second target object in the second image; and a second determination unit, configured to, in a case that the sum of scores of association is the maximum and greater than a predetermined sum-of-scores threshold, determine that the each first target object in the first image matches the each second target object in the second image respectively, and obtain the result of association between the each first target object and the each second target object.

In a possible implementation, the matching sub-module further includes:

a third determination unit, configured to, in a case that the maximum sum of scores of association in the sums of scores of association is less than or equal to the sum-of-scores threshold, determine that the each first target object in the first image does not match the each second target object in the second image.

In a possible implementation, the first determination module includes:

a first feature extraction sub-module, configured to perform feature extraction on the first input information to obtain a feature map corresponding to the first input information;

a second feature extraction sub-module, configured to perform feature extraction on the second input information to obtain a feature map corresponding to the second input information; and a prediction result determination sub-module, configured to obtain, according to the feature map corresponding to the first input information and the feature map corresponding to the second input information, the first prediction result that indicates the position of the first target object in the second image.

In a possible implementation, the first feature extraction sub-module is configured to perform feature extraction on the first input information by using a first network branch of a neural network to obtain the feature map corresponding to the first input information; and the second feature extraction sub-module is configured to perform feature extraction on the second input information by using a second network branch of the neural network to obtain the feature map corresponding to the second input information, where the first network branch and the second network branch have a same network parameter and network structure.

In a possible implementation, the prediction result determination sub-module includes:

a feature association unit, configured to perform feature association on the feature map corresponding to the first input information and the feature map corresponding to the second input information to obtain a first associated feature map; and a prediction result determination unit, configured to obtain, based on the first associated feature map, the first prediction result that indicates the position of the first target object in the second image.

In a possible implementation, the first acquisition module includes:

a region determination sub-module, configured to determine a first image region of the first target object in the first image according to a detection result for the first target object in the first image; and an attention map determination sub-module, configured to determine the first attention map of the first target object according to the first image region and a second image region other than the first image region in the first image.

In a possible implementation, the region determination sub-module includes:

a first acquisition unit, configured to acquire a first initial image with an image size matching that of the first image;

a first setting unit, configured to set a pixel value of pixels in a first image region in the first initial image as a first pixel value, where the first image region in the first initial image corresponds to the first image region in the first image; and a second setting unit, configured to set a pixel value of pixels in a second image region in the first initial image as a second pixel value to obtain the first attention map of the first target object, where the second image region in the first initial image is a region other than the first image region in the first initial image, and the first pixel value is not equal to the second pixel value.

In a possible implementation, the second acquisition module includes:

a second acquisition unit, configured to acquire a second initial image with an image size matching that of the second image; and a third setting unit, configured to set a pixel value of pixels in the second initial image as a third pixel value to obtain the second mask image.

In one possible implementation, the apparatus further includes:

an image fusion module, configured to fuse the first image with the first attention map to obtain the first input information.

In a possible implementation, the image fusion module includes:

an adding sub-module, configured to add the first image with the first attention map in a set dimension to obtain the first input information, or a splicing sub-module, configured to splice the first image with the first attention map in a set dimension to obtain the first input information.

In one possible implementation, the first image and the second image are obtained by capturing a same scene synchronously at different angles of view.

In some embodiments, the functions provided by or the modules included in the apparatuses provided in the embodiments of the present disclosure may be used to implement the methods described in the foregoing method embodiments. For specific implementations, reference may be made to the description in the method embodiments above. For the purpose of brevity, details are not described herein repeatedly.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium.

The embodiments of the present disclosure further provide an electronic device, including: a processor; and a memory configured to store processor-executable instructions, where the processor is configured to execute the foregoing method.

The electronic device may be provided as a terminal, a server, or other forms of devices.

Figure 6:
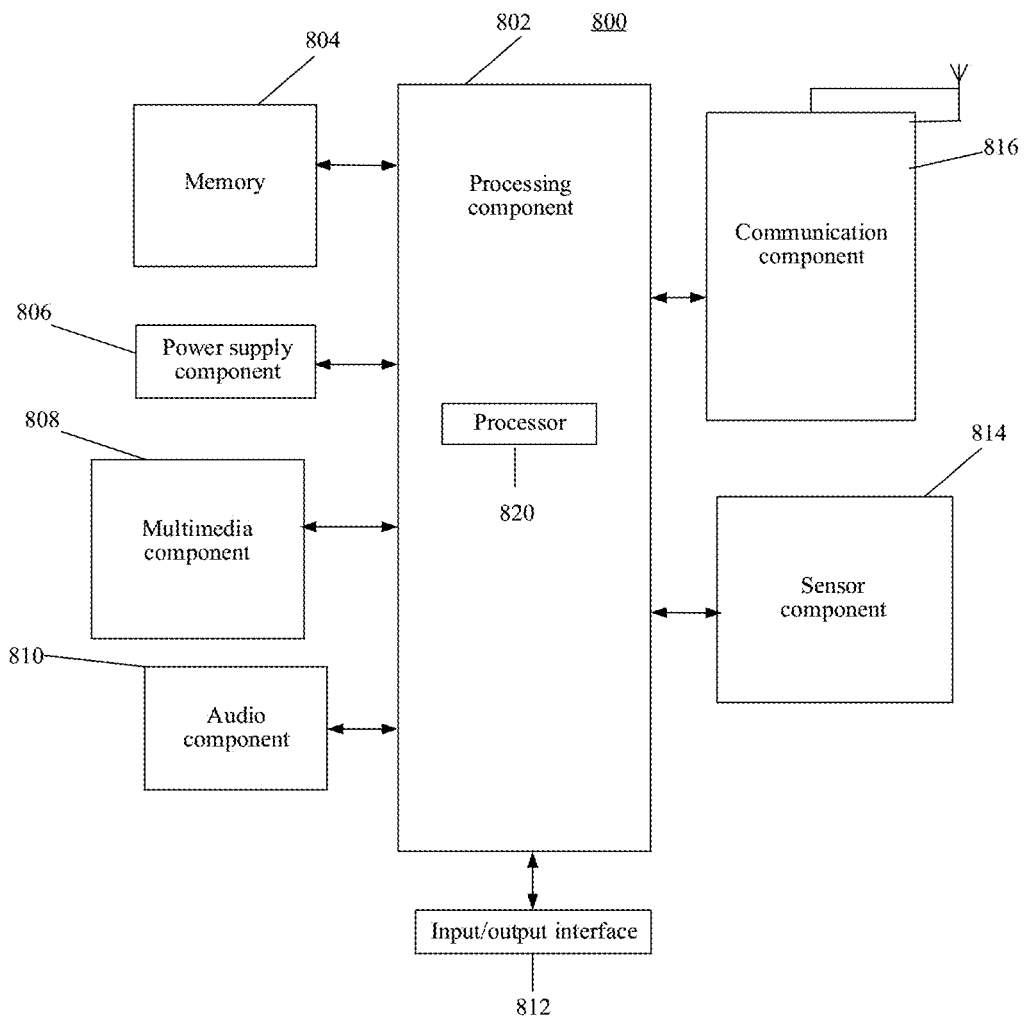
FIG. 6 shows a block diagram of an electronic device according to embodiments of the present disclosure.

FIG. 6 is a block diagram of an electronic device 800 according to one exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 6, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or sent by means of the communication component 816. In some embodiments, the audio component 810 further includes a speaker for outputting an audio signal.

The I/O interface 812 provides an interface between the processing component 802 and a peripheral interface module, and the peripheral interface module is a keyboard, a click wheel, a button, or the like. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect the position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the electronic device 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements, to execute the method above.

In an exemplary embodiment, further provided is a non-volatile computer-readable storage medium or a volatile computer-readable storage medium, for example, a memory 804 including computer program instructions, which can executed by the processor 820 of the electronic device 800 to implement the method above.

Figure 7:
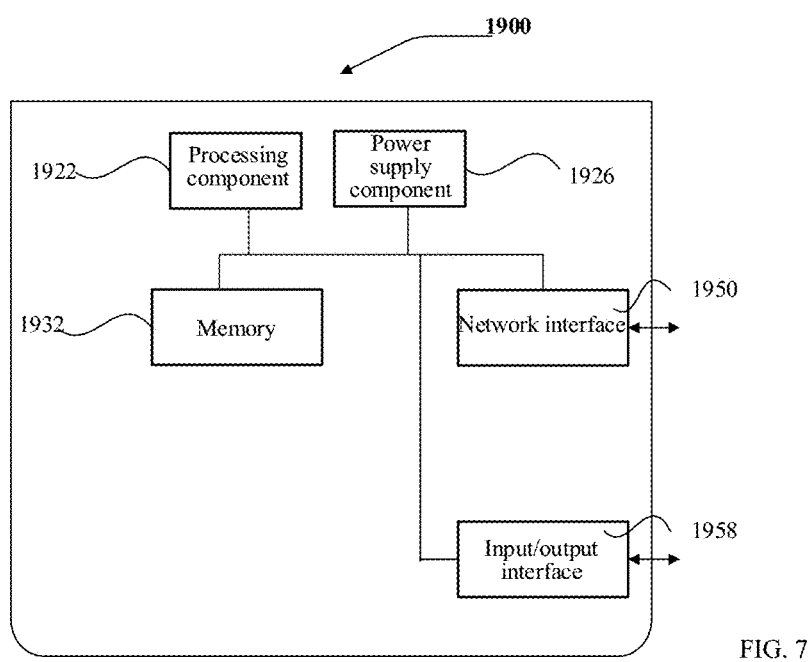
FIG. 7 shows a block diagram of an electronic device according to embodiments of the present disclosure.

FIG. 7 is a block diagram of an electronic device 1900 according to one exemplary embodiment. For example, the electronic device 1900 may be provided as a server. With reference to FIG. 7, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to execute the method above.

The electronic device 1900 may further include a power component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, further provided is a non-volatile computer-readable storage medium or a volatile computer-readable storage medium, for example, a memory 1932 including computer program instructions, which can executed by the processing component 1922 of the electronic device 1900 to implement the method above.

The present disclosure may be a system, a method, and/or a computer program product. The computer program product may include a computer-readable storage medium, on which computer-readable program instructions used by the processor to implement various aspects of the present disclosure are stored.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer-readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer-readable program instruction described here is downloaded to each computing/processing device from the computer-readable storage medium, or downloaded to an external computer or an external storage device via a network, such as the Internet, a Local Area Network (LAN), a Wide Area Network (WAN), and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instruction from the network, and forwards the computer-readable program instruction, so that the computer-readable program instruction is stored in a computer-readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including an LAN or a WAN, or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer-readable program instructions, and the electronic circuit can execute the computer-readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer-readable program instructions.

These computer-readable program instructions may be provided for a general-purpose computer, a dedicated computer, or a processor of other programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer-readable program instructions may also be stored in a computer-readable storage medium, and these instructions instruct a computer, a programmable data processing apparatus, and/or other devices to work in a specific manner. Therefore, the computer-readable storage medium having the instructions stored thereon includes a manufacture, and the manufacture includes instructions in various aspects for implementing the specified function/action in the one or more blocks in the flowcharts and/or block diagrams.

The computer-readable program instructions may also be loaded onto a computer, other programmable data processing apparatuses, or other devices, so that a series of operation steps are executed on the computer, the other programmable apparatuses, or the other devices, thereby generating a computer-implemented process. Therefore, the instructions executed on the computer, the other programmable apparatuses, or the other devices implement the specified function/action in the one or more blocks in the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, the functions noted in the block may also occur out of the order noted in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. Many modifications and variations will be apparent to a person of ordinary skill in the art without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

The invention claimed is:

1. An image processing method, comprising:
acquiring a first image and a first attention map of a first target object in the first image, wherein the first attention map indicates the position of the first target object in the first image;
acquiring a second image and a second mask image of the second image, wherein pixel values of pixels in the second mask image are equal; and
obtaining, according to first input information and second input information, a first prediction result that indicates the position of the first target object in the second image, wherein the first input information is determined according to the first image and the first attention map, and the second input information is determined according to the second image and the second mask image.

2. The method according to claim 1, further comprising:
acquiring a second attention map of the second image according to a detection result for a second target object in the second image, wherein the second attention map indicates the position of the second target object in the second image;
wherein, after obtaining the first prediction result, the method further comprises:
obtaining, according to third input information and fourth input information, a first score of association that represents the degree of association between the first target object and the second target object, wherein the third input information is determined according to the second image and the second attention map, and the fourth input information is determined according to the second image and the first prediction result; and determining a result of association between the first target object and the second target object according to the first score of association.

3. The method according to claim 1, wherein obtaining, according to first input information and second input information, the first prediction result that indicates the position of the first target object in the second image comprises:
performing feature extraction on the first input information to obtain a feature map corresponding to the first input information;
performing feature extraction on the second input information to obtain a feature map corresponding to the second input information; and
obtaining, according to the feature map corresponding to the first input information and the feature map corresponding to the second input information, the first prediction result that indicates the position of the first target object in the second image.

4. The method according to claim 2, further comprising:
obtaining, according to the first input information and the third input information, a second score of association that represents the degree of association between the first target object and the second target object; and
wherein determining the result of association between the first target object and the second target object according to the first score of association comprises:
determining the result of association between the first target object and the second target object according to the first score of association and the second score of association.

5. The method according to claim 2, further comprising:
acquiring a second prediction result that indicates the position of the second target object in the first image;
obtaining, according to fifth input information and the first input information, a third score of association that represents the degree of association between the first target object and the second target object, wherein the fifth input information is determined according to the first image and the second prediction result; and
wherein determining the result of association between the first target object and the second target object according to the first score of association comprises:
determining the result of association between the first target object and the second target object according to the first score of association and the third score of association.

6. The method according to claim 3, wherein obtaining, according to the feature map corresponding to the first input information and the feature map corresponding to the second input information, the first prediction result that indicates the position of the first target object in the second image comprises:
performing feature association on the feature map corresponding to the first input information and the feature map corresponding to the second input information to obtain a first associated feature map; and
obtaining, based on the first associated feature map, the first prediction result that indicates the position of the first target object in the second image.

7. The method according to claim 5, wherein determining the result of association between the first target object and the second target object according to the first score of association and the third score of association comprises:
determining a final score of association between the first target object and the second target object according to the first score of association and the third score of association;

in a case that the final score of association is greater than a score threshold, determining that the result of association indicates the first target object being potentially associated with the second target object; and
in a case that the final score of association is less than or equal to the score threshold, determining that the result of association indicates the first target object being not associated with the second target object.

8. The method according to claim 5, wherein determining the result of association between the first target object and the second target object according to the first score of association and the third score of association comprises:
determining a final score of association between the first target object in the first image and the second target object according to the first score of association and the third score of association; and
matching, according to the final score of association between each first target object in the first image and each second target object in the second image, the each first target object with the each second target object to obtain the result of association between the each first target object and the each second target object.

9. The method according to claim 8, wherein matching, according to the final score of association between each first target object in the first image and each second target object in the second image, the each first target object with the each second target object to obtain the result of association between the each first target object and the each second target object comprises:
determining a sum of scores of association between the each first target object and the each second target object according to the final score of association between the each first target object in the first image and the each second target object in the second image;
in a case that the sum of scores of association is the maximum and greater than a predetermined sum-of-scores threshold, determining that the each first target object in the first image matches the each second target object in the second image respectively, and obtaining the result of association between the each first target object and the each second target object; and
in a case that the maximum sum of scores of association in the sums of scores of association is less than or equal to the sum-of-scores threshold, determining that the each first target object in the first image does not match the each second target object in the second image.

10. An image processing apparatus, comprising:
a processor; and
a memory configured to store processor-executable instructions,
wherein the processor is configured to invoke the instructions stored in the memory, so as to:
acquire a first image and a first attention map of a first target object in the first image, wherein the first attention map indicates the position of the first target object in the first image;
acquire a second image and a second mask image of the second image, wherein pixel values of pixels in the second mask image are equal; and
obtain, according to first input information and second input information, a first prediction result that indicates the position of the first target object in the second image, wherein the first input information is determined according to the first image and the first attention map, and the second input information is determined according to the second image and the second mask image.

11. The apparatus according to claim 10, wherein the processor is further configured to:
  acquire a second attention map of the second image according to a detection result for a second target object in the second image, wherein the second attention map indicates the position of the second target object in the second image;
  obtain, according to third input information and fourth input information, a first score of association that represents the degree of association between the first target object and the second target object after obtaining the first prediction result, wherein the third input information is determined according to the second image and the second attention map, and the fourth input information is determined according to the second image and the first prediction result; and
  determine a result of association between the first target object and the second target object according to the first score of association.

12. The apparatus according to claim 10, wherein obtaining, according to first input information and second input information, the first prediction result that indicates the position of the first target object in the second image comprises:
  performing feature extraction on the first input information to obtain a feature map corresponding to the first input information;
  performing feature extraction on the second input information to obtain a feature map corresponding to the second input information; and
  obtaining, according to the feature map corresponding to the first input information and the feature map corresponding to the second input information, the first prediction result that indicates the position of the first target object in the second image.

13. The apparatus according to claim 11, wherein the processor is further configured to:
  obtain, according to the first input information and the third input information, a second score of association that represents the degree of association between the first target object and the second target object,
  wherein determining the result of association between the first target object and the second target object according to the first score of association comprises:
  determining the result of association between the first target object and the second target object according to the first score of association and the second score of association.

14. The apparatus according to claim 11, wherein the processor is further configured to:
  acquire a second prediction result that indicates the position of the second target object in the first image; and
  obtain, according to fifth input information and the first input information, a third score of association that represents the degree of association between the first target object and the second target object, wherein the fifth input information is determined according to the first image and the second prediction result,
  wherein determining the result of association between the first target object and the second target object according to the first score of association comprises:
  determining the result of association between the first target object and the second target object according to the first score of association and the third score of association.

15. The apparatus according to claim 12, wherein obtaining, according to the feature map corresponding to the first input information and the feature map corresponding to the second input information, the first prediction result that indicates the position of the first target object in the second image comprises:
  performing feature association on the feature map corresponding to the first input information and the feature map corresponding to the second input information to obtain a first associated feature map; and
  obtaining, based on the first associated feature map, the first prediction result that indicates the position of the first target object in the second image.

16. The apparatus according to claim 14, wherein determining the result of association between the first target object and the second target object according to the first score of association and the third score of association comprises:
  determining a final score of association between the first target object and the second target object according to the first score of association and the third score of association;
  in a case that the final score of association is greater than a score threshold, determining that the result of association indicates the first target object being potentially associated with the second target object; and
  in a case that the final score of association is less than or equal to the score threshold, determining that the result of association indicates the first target object being not associated with the second target object.

17. The apparatus according to claim 14, wherein determining the result of association between the first target object and the second target object according to the first score of association and the third score of association comprises:
  determining a final score of association between the first target object in the first image and the second target object according to the first score of association and the third score of association; and
  matching, according to the final score of association between each first target object in the first image and each second target object in the second image, the each first target object with the each second target object to obtain the result of association between the each first target object and the each second target object.

18. The apparatus according to claim 17, wherein matching, according to the final score of association between each first target object in the first image and each second target object in the second image, the each first target object with the each second target object to obtain the result of association between the each first target object and the each second target object comprises:
  determining a sum of scores of association between the each first target object and the each second target object according to the final score of association between the each first target object in the first image and the each second target object in the second image;
  in a case that the sum of scores of association is the maximum and greater than a predetermined sum-of-scores threshold, determining that the each first target object in the first image matches the each second target object in the second image respectively, and obtaining the result of association between the each first target object and the each second target object; and
  in a case that the maximum sum of scores of association in the sums of scores of association is less than or equal to the sum-of-scores threshold, determining that the each first target object in the first image does not match the each second target object in the second image.

19. A non-transitory computer-readable storage medium, having computer program instructions stored thereon, wherein when the computer program instructions are executed by a processor, the processor is caused to perform the operations of:
  acquiring a first image and a first attention map of a first target object in the first image, wherein the first attention map indicates the position of the first target object in the first image;
  acquiring a second image and a second mask image of the second image, wherein pixel values of pixels in the second mask image are equal; and
  obtaining, according to first input information and second input information, a first prediction result that indicates the position of the first target object in the second image, wherein the first input information is determined according to the first image and the first attention map, and the second input information is determined according to the second image and the second mask image.

* * * * *